United States Patent [19]

Haga et al.

[11] Patent Number: 5,742,853

[45] Date of Patent: Apr. 21, 1998

[54] INFORMATION SETTING AND DISPLAY DEVICE FOR A CAMERA

[75] Inventors: Masaaki Haga; Katsuki Machida; Hideaki Tsuji, all of Tokyo, Japan

[73] Assignee: Asahi Kogaku Kogyo Kabushiki Kaisha, Tokyo, Japan

[21] Appl. No.: 801,182

[22] Filed: Feb. 18, 1997

Related U.S. Application Data

[63] Continuation of Ser. No. 486,252, Jun. 7, 1995, abandoned.

[30] Foreign Application Priority Data

Jun. 9, 1994 [JP] Japan .................................. 6-151488

[51] Int. Cl.⁶ ........................ G03B 17/18; G09G 3/00
[52] U.S. Cl. ...................... 396/292; 396/299; 345/124
[58] Field of Search ............................... 396/287, 290, 396/292, 299; 116/213; 345/124

[56] References Cited

U.S. PATENT DOCUMENTS

| | | |
|---|---|---|
| 3,947,862 | 3/1976 | Watanabe et al. . |
| 4,118,716 | 10/1978 | Suzuki et al. ............... 396/299 X |
| 4,426,142 | 1/1984 | Iura et al. . |
| 4,497,564 | 2/1985 | Meguro et al. . |
| 4,534,640 | 8/1985 | Ito et al. . |
| 4,598,986 | 7/1986 | Shiratori et al. . |
| 4,674,854 | 6/1987 | Kawamura et al. . |
| 4,678,306 | 7/1987 | Kiuchi ........................... 354/217 |
| 4,692,008 | 9/1987 | Arakawa et al. . |
| 4,814,757 | 3/1989 | Patterson et al. ............ 345/124 X |
| 5,162,833 | 11/1992 | Taka ............................ 354/289.12 |
| 5,210,569 | 5/1993 | Harada ........................... 354/442 |
| 5,223,888 | 6/1993 | Fukahori . |
| 5,241,334 | 8/1993 | Kobayashi et al. ............ 354/195.1 |
| 5,283,606 | 2/1994 | Konno et al. . |
| 5,289,205 | 2/1994 | Torres ............................ 345/124 |
| 5,479,237 | 12/1995 | Kitaoka ............................ 354/474 |
| 5,485,238 | 1/1996 | Miura et al. . |
| 5,555,064 | 9/1996 | Machida et al. . |

*Primary Examiner*—W. B. Perkey
*Attorney, Agent, or Firm*—Greenblum & Bernstein, P.L.C.

[57] ABSTRACT

An information setting and displaying device for a camera has a rotary dial mounted on a camera body to be rotatable stepwise. A display member is provided adjacent the rotary dial, and includes at least a pair of display sub-areas arranged along the direction in which the rotary dial rotates. An information setting mechanism sets information by operating said rotary dial. A display control mechanism displays current set information in one of the display sub-areas and displays a proposed information, to be set as the rotary dial rotates in a direction from one of the display sub-area toward the other display sub-area by at least one step. The proposed information is displayed in the other display sub-area. The information includes at least one of a shutter speed, a diaphragm stop, and an exposure compensation value.

31 Claims, 14 Drawing Sheets

INFORMATION SETTING AND DISPLAY DEVICE FOR A CAMERA

This application is a continuation of application Ser. No. 08/486,252, filed Jun. 7, 1995, now abandoned.

BACKGROUND OF THE INVENTION

1. Field of the invention

The present invention relates to an information setting and displaying device for a camera that allows information required for control of a camera to be set and and displayed.

2. Description of Related Art

An information setting and displaying device has already been used in the field of single-lens reflex cameras, in which the information such as a shutter speed and a diaphragm stop is set by operating a rotary dial or the like. Therefore, information set in this manner is displayed on a display member such as a liquid crystal display (LCD) panel so as to be visually determined by an operator.

The conventional information setting and displaying device mentioned above is provided with a single display area in which a current set value is displayed. It is, however impossible for the operator to know prior to adjusting the dial how the value in the display area will change as the rotary dial rotates. Consequently, the operator must rotate the rotary dial in a selected direction to check the changed value. If dial was the rotary dials not rotated in a proper direction, the rotary dial must then be returned to its starting position and then rotated in the reverse direction. Therefore, the conventional information and displaying device is difficult to handle.

SUMMARY OF THE INVENTION

It is a primary object of the present invention to provide an improved information setting and displaying device for a camera that allows an operator to visually determine, prior to actual operation of adjustment, how the current set information will change depending on the direction in which the rotary dial will be rotated.

To achieve the object mentioned above, according to the present invention, there is provided an information setting and displaying device for a camera comprising a rotary dial stepwise rotatably mounted on a camera body. A display member is provided adjacent the rotary dial, and includes at least a pair of display sub-areas arranged along the direction in which the rotary dial is rotated. An information setting mechanism for selecting information by operating said rotary dial, and a display control mechanism functioning to display current set information in one of the display sub-areas and to display a following information to be set as the rotary dial is rotated in the direction from said one display sub-area toward the other display sub-area by one or more step(s) in the other digital value display sub-area.

According to another aspect of the invention, there is provided an information setting and displaying device for a camera further comprising a memory for storing digital information which is changeable by operating the rotary dial. Digital value tables contain a plurality of digital values arranged in a predetermined order. The information setting mechanism sets information read from the memory and the display control mechanism displays the information read from the memory.

According to still another aspect of the invention, there is provided an information setting and displaying device for a camera comprising a rotary dial stepwise mounted rotatably in an adjustable manner on a camera body with a unit step corresponding to a predetermined angle of rotation. A display member is provided adjacent to the rotary dial and includes at least a pair of digital value display sub-areas arranged in parallel along the direction in which the rotary dial rotates. A storage mechanism for holding digital information in the form of digital value tables changeable by operation of the rotary dial each containing a plurality of digital values arranged in a predetermined order. A mechanism sets the digital information by operating the rotary dial. A display control mechanism displays a current set digital information value in one of the digital value sub-areas and read from the storage mechanism, which is a digital value set as the rotary dial rotates in a direction from one display sub-area toward the other display sub-area by one or more step(s) in the other digital value display sub-area.

According to still another aspect of the invention, there is provided an information setting and displaying device for a camera comprising a rotary dial rotatably mounted in an adjustable manner. A display member is provided adjacent the rotary dial and includes a current value display sub-area and at least one proposed value display sub-area. A storage mechanism holds digital information in the form of tables changeable by operating the rotary dial. Each table contains digital values arranged in a predetermined order. A mechanism sets the digital information by operating the rotary dial. A display control mechanism displays a current set digital information value in the current value display sub-area and then to the storage mechanism a digital information value to be set as said rotary dial is rotated toward the proposed value display sub-area and then to display this digital information value in the proposed value display sub-area.

According to still another aspect of the invention, there is provided an information setting and displaying device for a camera having a rotary dial stepwise rotatably mounted in an adjustable manner on a camera body with a unit step corresponding to a predetermined angle of rotation. A member is provided adjacent the rotary dial and includes at least a pair of digital value display sub-areas arranged in parallel along the direction in which the rotary dial is rotated. A storage mechanism holds digital information, changeable by operating the rotary dial, in the form of digital value tables each containing a plurality of digital values arranged in a predetermined order. A mechanism sets the digital information by operating the rotary dial. A display control mechanism displays a pair of adjacent digital information values in the corresponding table of digital values in the digital value display sub-areas, respectively, and changes the digital information values displayed in the digital information value display sub-areas successively in accordance with a predetermined order in the table in operative association with the operation of said rotary dial.

According to still another embodiment of the present invention there is provided an information setting and displaying device for a camera having, a rotary dial stepwise rotatably mounted in an adjustable manner on a camera body with a unit step corresponding to a predetermined angle of rotation. A display member is provided adjacent the rotary dial and includes at least a pair of digital value display sub-areas arranged in parallel along the direction in which the rotary dial is rotated, a storage mechanism holds digital information, being changeable by operating the rotary dial, in the form of digital value tables each containing a plurality of digital values arranged in a predetermined order. A mechanism sets the digital information by operating the rotary dial. A display control mechanism displays a current set information value in one of the display sub-areas and reads from the storage mechanism an information value to be set as the rotary dial is rotated toward the other display sub-area and then to display this information value in the other display sub-area.

According to a further embodiment of the present invention there is provided an information setting and displaying device for a camera having, a rotary dial rotatably mounted in an adjustable manner. A display member is provided adjacent the rotary dial and includes three digital value display sub-areas arranged in parallel along the direction in which the rotated dial is rotated. A pair of arrow display sub-areas are arranged between each pair of adjacent ones of the three digital value display sub-areas to indicate the direction in which the digital value display will be changed. A storage mechanism holds digital information, being changeable by operating the rotary dial, in the form of digital value tables each containing a plurality of digital values arranged in a predetermined order. A mechanism sets the digital information by operating the rotary dial. A display control mechanism displays a current set digital information value in the central sub-area of the digital value display sub-areas, to display digital information values immediately preceding and following the current set value in the corresponding one of the digital value tables in the digital value display sub-areas located around the central sub-area, respectively, and to display arrows respectively pointing in opposite directions in the arrow display sub-areas so as to indicate a relationship between the direction in which the rotary dial is rotated and the sub-area displaying the digital information value to be set as the rotary dial is rotated.

The present disclosure relates to subject matter contained in Japanese patent application No. 06-151488 (filed on Jun. 9, 1994) which is expressly incorporated herein by reference in its entirety.

DESCRIPTION OF THE PREFERRED EMBODIMENT

The information setting and displaying device of the present invention will be described specifically as applied to a single-lens reflex camera with reference with the accompany in drawings.

Figure 1:
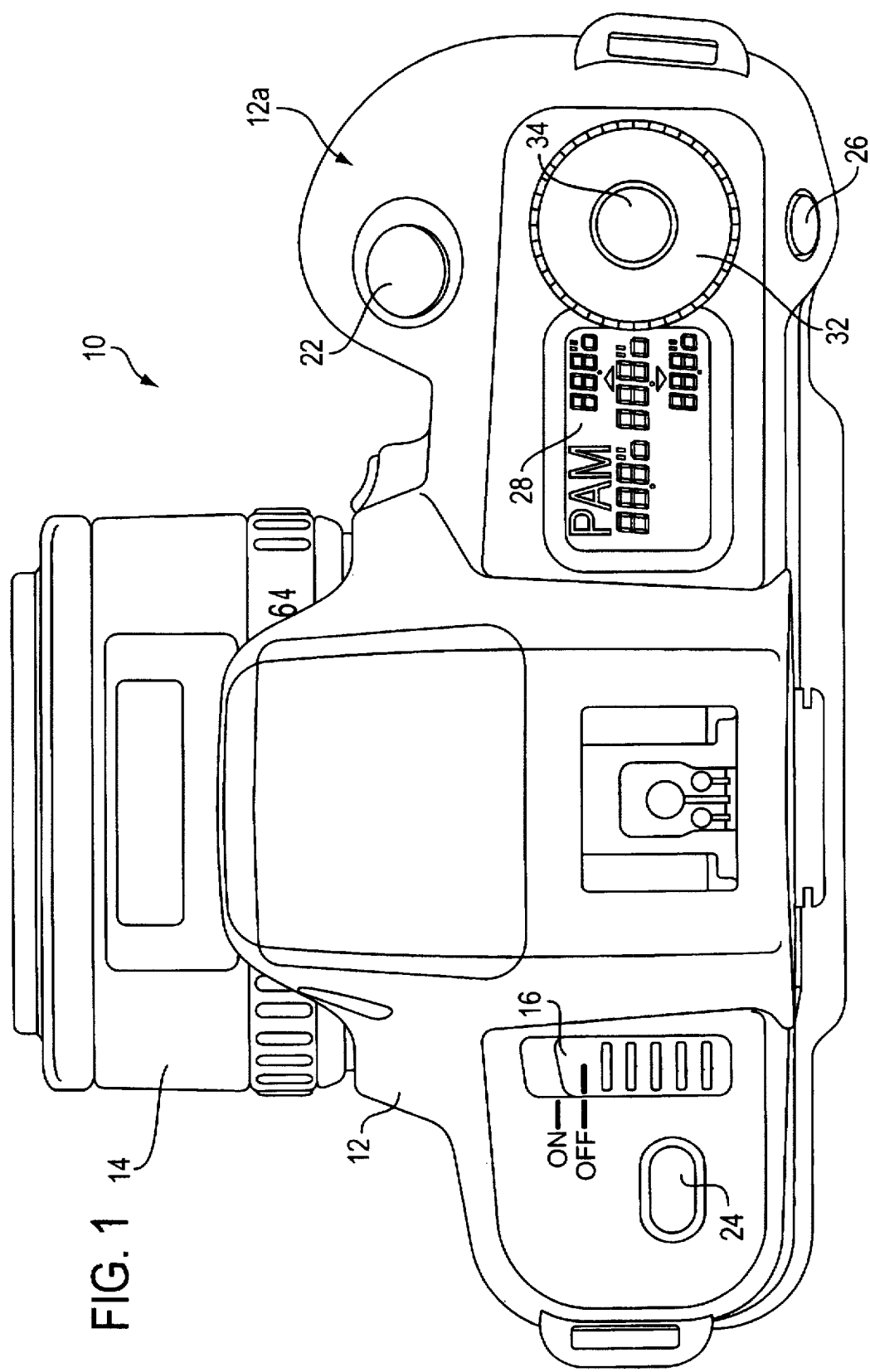
FIG. 1 is a plan view showing an outer appearance of a single-lens reflex camera to which the information setting and displaying device of the invention is applied.

As shown in FIG. 1, a single-lens reflex camera 10 generally comprises a camera body 12 and a photographic taking lens 14 mounted detachably on the camera body 12.

The camera body 12 is provided on its top surface with a main switch 16, a mode button 24, and a grip portion 12a. The grip portion 12a is provided with a release button 22.

A rotary dial 32 is provided behind the drive button 32 and is stepwise rotatable relative to the camera body 12. A display member in the form of a liquid crystal display panel 28 is provided adjacent the rotary dial 32.

The rotary dial 32 is centrally provided with a mode change button 34. An exposure compensating button 26 is provided behind rotary dial 32 on a rear side of the camera body 12.

Figure 2:
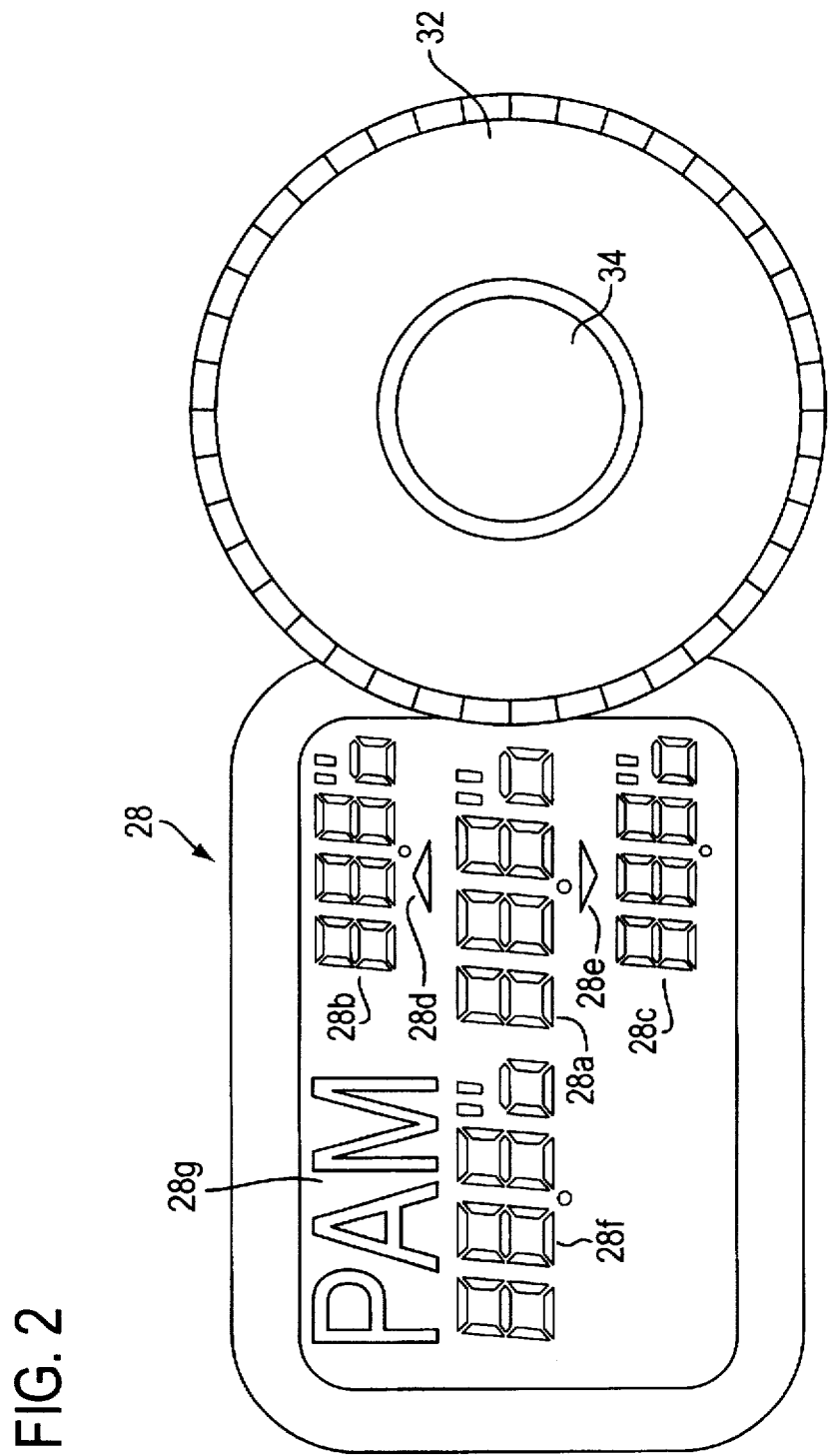
FIG. 2 is a plan view, in an enlarged scale, of a rotary dial and a liquid crystal display panel as seen in FIG. 1.

The liquid crystal display panel 28 has a dial display area 28A provided with, as shown in FIG. 2, three digital value display sub-areas 28a, 28b, and 28c arranged in parallel to one another in a direction tangential to the rotary dial 32. First and second arrow display sub-areas 28d and 28e are interposed between each pair of adjacent digital value display sub-areas 28a, 28b, and 28c. Digital information changes on the dial display area 28A as the rotary dial 32 rotates.

The digital value display sub-area 28a, defined by a middle (central) area portion of the dial display area 28A, serves as a first current value display sub-area. The digital value display sub-area 28b, located above the sub-area 28a, serves as a first proposed value display sub-area adapted to display a value set as the rotary dial 32 is rotated by one step clockwise (as viewed in the figures). The digital value display sub area 28c, located below the sub-area 28a, serves as a second proposed value display sub-area adapted to display a value set as the rotary dial 32 is rotated by one step counterclockwise (as viewed in the figures).

The three digital value display sub-areas 28a, 28b, and 28c are arranged in parallel to one another in this embodiment. The first current value display sub-area 28a is larger than the proposed value display sub-areas 28b, 28c visually accentuate the current value.

The liquid crystal display panel 28 also includes, a second current value display sub-area 28f adapted for displaying a current value of digital information. This information is independent from the digital information changed by operation of the rotary dial 32. Panel 28 also includes a mode display sub-area 28g adapted for selective display of letters "P", "A", "and M".

While, for better understanding, all the segments of the liquid crystal display panel 28, as shown in FIGS. 1 and 2, are turned on, it should be understood that these segments can be partially and selectively turned on or off during actual use to display a desired information, as described in more detail below.

Figure 3:
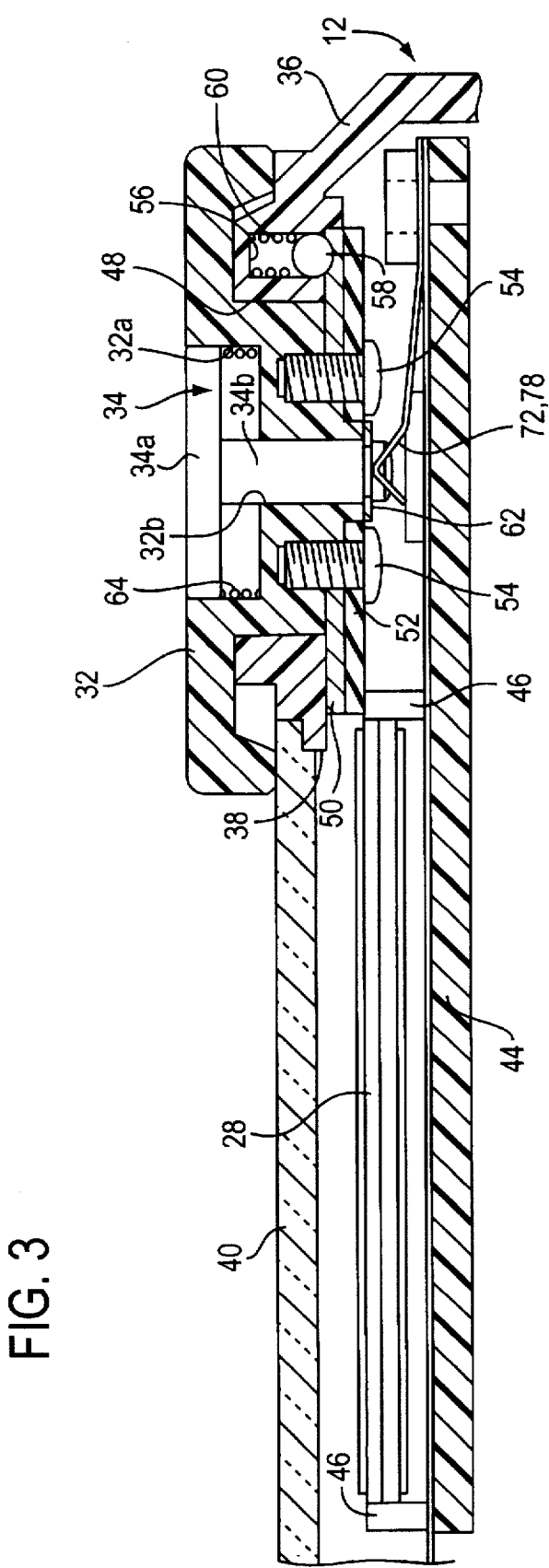
FIG. 3 is a sectional view taken along a plane in the proximity of the rotary dial shown in FIG. 1.

On a base plate 44, surrounded by a top decorative member 36 covering the top surface of the camera body 12, the liquid crystal display panel 28 is fixedly mounted with interposition of a fixing stay 46, as shown by FIG. 3. Panel 28 is visible externally through a transparent member 40 mounted in a display opening 38.

The rotary dial 32 is rotatably inserted into a circular through-hole 48 extending through the top decorative member 36 in a direction of its thickness. A ring-shaped click plate 50 and code plate 52 are secured to the bottom surface of the rotary dial 32, as shown in FIG. 3, by screws 54.

The top surface of the click plate 50 is formed with twelve click grooves (holes) 50a on a concentric circle at 30° intervals. The top decorative member 36 is formed with click ball receiving holes 56 to receive a click ball 58 in cooperation with the respective click grooves (holes) 50a. The click ball 58 is normally biased by a spring 60 toward the click plate 50. This click mechanism allows the rotary dial 32 to be locked every rotation by an angle of 30°. A click feeling allows an operator to perceive completion of each stepwise rotation by the angle of 30°.

The rotary dial 32 is centrally formed in its top surface with a planar circular recess 32a. At a center of this recess 32a, an axial bore 32b having a circular cross-section extends through the rotary dial 32 in a direction of the thickness. The mode change button 34 integrally comprises a disc-like button head 34a formed in such as manner so as to slidably fit in the recess 32a. A button shaft 34b, formed coaxially slidable with the button head 34a, is provided so that the mode change button 34 as a whole is located at the center of the rotary dial 32, and vertically movable.

Between the recess 32a and the button head 34a a spring 64 is disposed to bias the change-over button 34 to outwardly project from the recess 32. A locking member 62 is attached to the lower end of the slidable button shaft 34b to prevent the mode change button 34 from falling off from the rotary dial 32.

The base plate 44 is provided with a pair of brushes 72 and 78 which are in contact with a code plate 52 fixed to the rotary dial 32. The code plate 52 cooperates with the brushes 72 and 78 to form a rotational direction switch to detect the direction in which the rotary dial 32 is being rotated.

Figure 4:
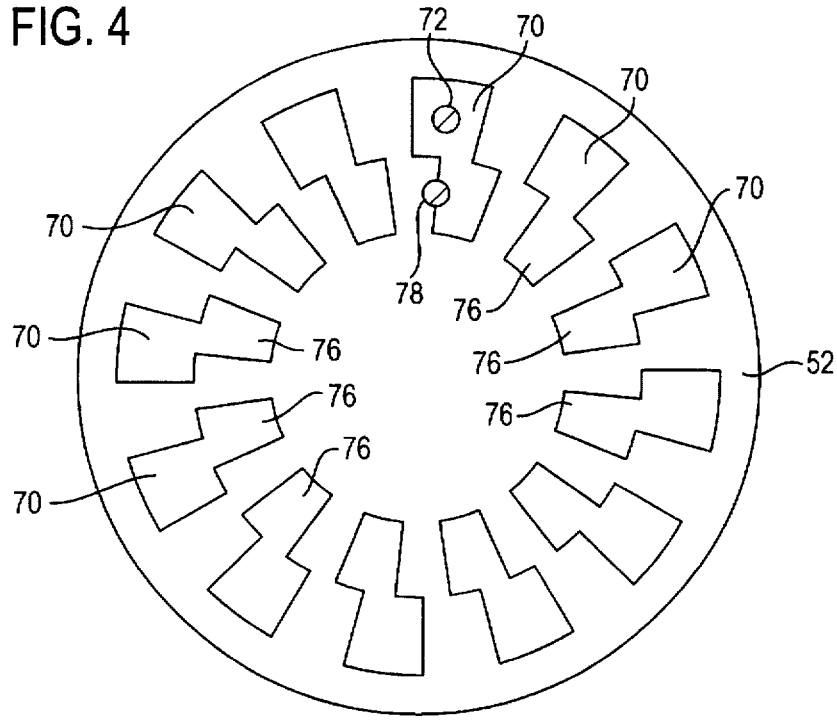
FIG. 4 is a plan view showing a code plate fixed to the rotary dial.

Referring to FIG. 4, the code plate 52 includes a disc of an insulative material, on which outer and inner rows of electrically conductive patterns 70 and 76 are circumferentially arranged at regular intervals. Specifically, the conductive patterns 70 and 76 belonging to the respective rows are defined by sectors, each having an angular width of 15° around the center of the code plate 52. Each row has twelve such sectors arranged at angular intervals of 15°. The inner and outer rows of patterns are arranged with a phase difference of 7.5°, and are electrically connected to each other where their phases overlap each other.

The first and second brushes 72 and 78 align with each other in the radial direction, and are brought into contact with the outer and inner conductive patterns 70 and 76, respectively. All the conductive patterns 70 and 76 are grounded, and timing of a change occurring in the conductive relationship between the respective brushes 72 and 78 and the ground detects the direction in which the rotary dial 32 is being rotated.

While the first embodiment is described as utilizing a relative change in the angular position of the rotary dial 32 as information, it is also possible, without departing from the scope of the invention, to provide an arrangement such that an absolute coordinate of the angular position may be utilized as useful information based on the patterns of the code plate 52 by increasing the number of brushes.

Figure 5:
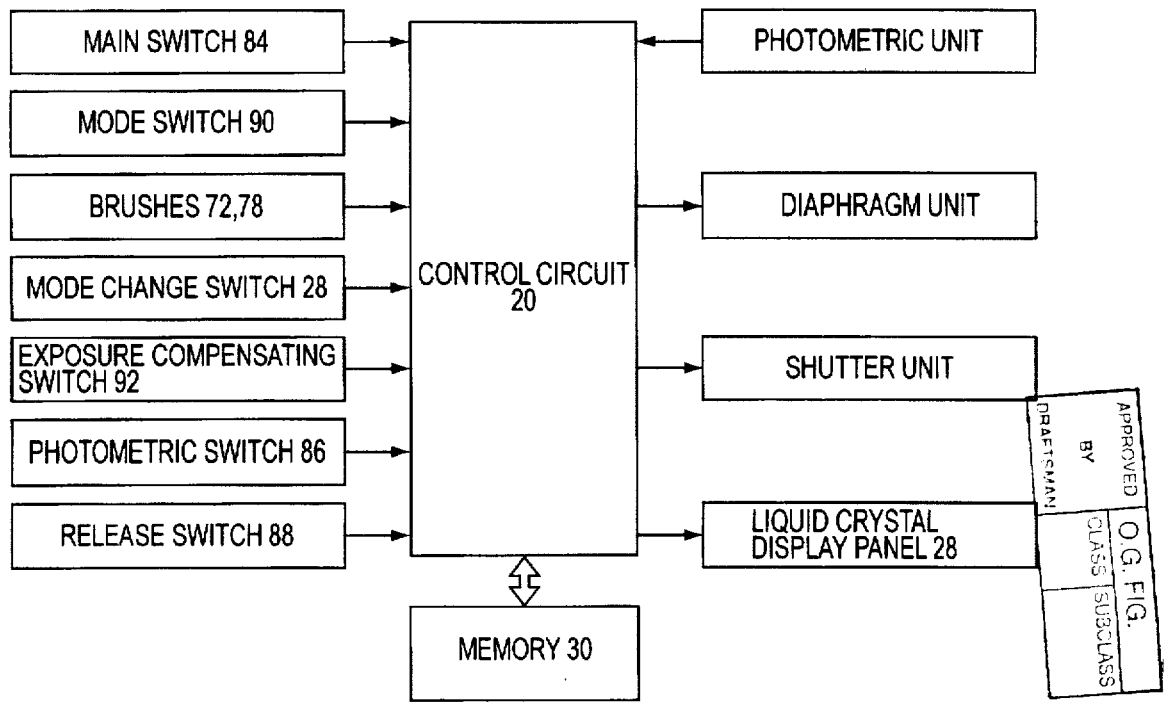
FIG. 5 is a block diagram showing a control circuit provided in the camera.

Referring now to FIG. 5, the circuit arrangement of a control unit of an information setting and displaying device of the present invention will be described. It should be understood that FIG. 5 is a simplified block diagram, showing only the principle parts for controlling the display extracted from the complete control circuit of the camera.

A control circuit 20 is responsive to information input from various switches, photometric information input from a photometric unit and film sensitivity information input from a film sensitivity detector circuit (not shown). Control circuit 20 uses these inputs to control various units such as a diagram unit, contained within the photographic taking lens 14, a shutter unit, and the liquid crystal display panel 28.

Switches connected to the control circuit 20 include, a main switch 84, which is turned ON as the main switch 16 provided on the camera body 12 is slidably moved to the ON position; a mode switch 90, which is turned ON as the mode button 24 is depressed the rotational direction switch comprising the code plate 52 of the rotary dial 32 and the brushes 72 and 78 provided in contact with this code plate 52; a mode change switch 82, which is turned ON as the mode change button 34 is depressed; an exposure compensating switch 92, which is turned ON as the exposure compensating button 26 is depressed; a photometric switch 86, which is turned ON when the release button 22 is half-depressed; and a release switch 88 which is turned ON when the release button 22 is fully depressed.

A storage means, in the form of a memory 30, is also connected to the control circuit 20. The memory 30 stores various predetermined values used by the control circuit 20 to calculate exposure or the like, and data to be displayed in the respective display sub-areas of the liquid crystal display panel 28 in the form of tables associated with respective pointers. The control circuit 20 controls setting of compensated exposure value, shutter speed and diaphragm stop so that, actual operation of displaying, the respective pointers may be used to read the data to be displayed from the tables stored in the memory 30.

The tables include an Xv display table used to display information relating to exposure compensation, a Tv display table used to display information relating to shutter speed setting, and an Av display table used to display information relating to diaphragm stop setting. The contents of these tables are shown in following TABLES 1, 2, 3.

TABLE 1

| Pointer | Display Data | ▼ Display | ▲ Display |
|---------|--------------|-----------|-----------|
| −3.5 | OFF(blank) | ON | OFF(blank) |
| −3.0 | −3.0 | ON | ON |
| −2.5 | −2.5 | ON | ON |
| −2.0 | −2.0 | ON | ON |
| −1.5 | −1.5 | ON | ON |
| −1.0 | −1.0 | ON | ON |
| −0.5 | −0.5 | ON | ON |
| 0.0 | 0.0 | ON | ON |
| 0.5 | 0.5 | ON | ON |
| 1.0 | 1.0 | ON | ON |
| 1.5 | 1.5 | ON | ON |
| 2.0 | 2.0 | ON | ON |
| 2.5 | 2.5 | ON | ON |
| 3.0 | 3.0 | ON | ON |
| 3.5 | OFF(blank) | OFF(blank) | ON |

TABLE 2

| Pointer | Display Data | ▼ Display | ▲ Display |
| --- | --- | --- | --- |
| −5.5 | OFF(blank) | ON | OFF(blank) |
| −5.0 | 30" | ON | ON |
| −4.5 | 20" | ON | ON |
| −4.0 | 15" | ON | ON |
| −3.5 | 10" | ON | ON |
| −3.0 | 8" | ON | ON |
| 9.0 | 500 | ON | ON |
| 9.5 | 750 | ON | ON |
| 10.0 | 1000 | ON | ON |
| 10.5 | 1500 | ON | ON |
| 11.0 | 2000 | ON | ON |
| 11.5 | OFF(blank) | OFF(blank) | ON |

TABLE 3

| Pointer | Display Data | ▼ Display | ▲ Display |
| --- | --- | --- | --- |
| −0.5 | OFF(blank) | ON | OFF(blank) |
| 0.0 | F1.0 | ON | ON |
| 0.5 | F1.2 | ON | ON |
| 1.0 | F1.4 | ON | ON |
| 1.5 | F2.0 | ON | ON |
| 2.0 | F2.5 | ON | ON |
| . | . | . | . |
| 11.0 | F45 | ON | ON |
| 11.5 | F54 | ON | ON |
| 12.0 | F64 | ON | ON |
| 12.5 | F76 | ON | ON |
| 13.0 | F90 | ON | ON |
| 13.5 | OFF(blank) | OFF(blank) | ON |

The above tables represent values which can be set by the camera. Fields beyond the maximum value and the minimum value contain a blank display (i.e., power OFF) data. Accordingly, the blank display is blank in the first and second proposed value display sub-areas when the set values exceed either the maximum value or the minimum value.

The method by which the information setting and displaying device of the present invention operates will be explained with reference with flow charts illustrated by FIGS. 6 through 10. The respective processing routines are executed by the control circuit 20.

Figure 6:
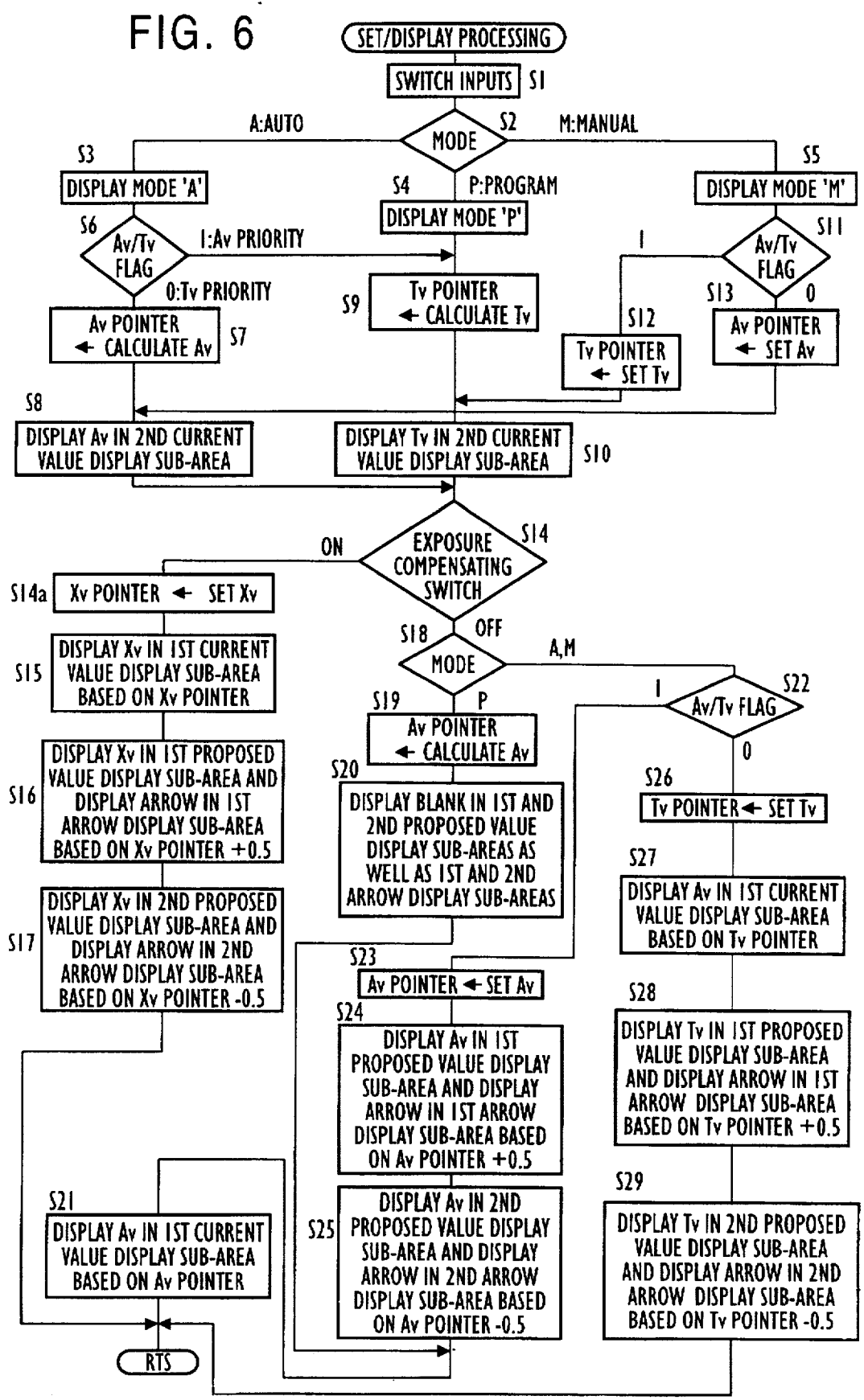
FIG. 6 is a flow chart showing a routine of setting and displaying executed by the control circuit.

FIG. 6 is a main flow chart illustrating a routine of setting and displaying. According to this routine, steps S1 through S13 generally relate to displaying data in the second current value display sub-area 28f and the mode display sub-area 28g, and steps S14 through S29 generally relate to displaying data in the dial display sub-areas 28a through 28e.

In step S1, respective switches are checked to perform data input which are then identified during step S2. According to the specific mode identified during step S2, one of AUTO "A", PROGRAM "P", or MANUAL "M" is displayed in the mode display sub-area 28g of the dial display area (steps S3 through S5).

In the AUTO (A) mode with priority given to Tv, the Av pointer is set to a digital value corresponding to an Av value obtained from exposure calculation. Appropriate display data is read from the Av table stored in the memory on the basis of the Av pointer, and displayed in the second current value display sub-area 28f (steps S6 through S8). It should be understood that the term "exposure calculation" used herein is the calculation in which an exposure value is determined from various parameters, such as the object to be photographed, an ISO speed, a shutter speed, and as a diaphragm stop.

In the AUTO (A) mode with priority given to Av, the Tv pointer is set to a digital value corresponding to a Tv value obtained from exposure calculation. Appropriate display data is read from the Tv table stored in the memory on the basis of the Tv pointer, and displayed in the second current value display sub-area 28f (steps S9 and S10).

The state of Av/Tv flag indicates whether priority is given to Tv or Av. The Av/Tv flag is alternately switched between 0 and 1 as the mode change button 34 is turned ON/OFF in AUTO or MANUAL mode.

In the MANUAL (M) mode with priority given to Av, the Tv pointer is set to a digital value corresponding to a manually set Av value (steps S5, S11, S13, S8). The data read from the appropriate table stored in the memory on the basis of the associated pointer is displayed in the second current value display sub-area 28f (steps S8 and S10) in the same manner as in the AUTO mode.

Step S14 determines whether the exposure compensating switch 92 is ON or OFF and determines if a digital value of pointer Xv corresponds to a current Xv value (step S14a). Based on this Xv pointer, appropriate data is read from the Xv table and displayed in the first current value display sub-area 28a of the dial display area 28A (step S15).

Subsequently, based on a value corresponding to the Xv pointer plus 0.5, appropriate display data is read, together with ON/OFF data for the arrow display, from the Xv table and displayed in the first proposed value display sub-area 28b and the first arrow display sub-area 28d, respectively (step S16). A mark "▲" will be displayed in the first arrow display sub-area 28d if ON is detected on the basis of the ON/OFF data for the arrow display.

Based on a value corresponding to the Xv pointer minus 0.5, appropriate display data is read, together with the ON/OFF data for the arrow display, from the Xv table and displayed in the second proposed value display-sub-area 28c and the second arrow display sub-area 28e, respectively (step S17). A mark "▼" will be displayed in the second arrow display sub-area 28e if ON is detected on the basis of the ON/OFF data for the arrow display.

If the exposure compensating switch 92 has been detected by step S14 to be OFF, the step S18 determines the photographing mode. If the mode is determined to be a PROGRAM mode, the Av pointer is set to the data corresponding to a calculated Av value (step S19). The first and second proposed value display sub-areas 28b and 28c, as well as the first and second arrow display sub-areas 28d and 28e, become blank, and the display data read from the Av table on the basis of the Av pointer set as mentioned above is displayed only in the first current value display sub-area 28a (steps S20 and S21).

In AUTO or MANUAL mode with priority given to Av, the Av pointer is set to the data corresponding to the a manually set Av value (step S23). Appropriate display data is then read, together with ON/OFF data for the arrow display from the Av table, on the basis of a value equal to the Av pointer plus 0.5. This data is displayed in the first proposed value display sub-area 28b and the first arrow display sub-area 28d, respectively (step S24). The mark "▲" is displayed in the first arrow display sub-area 28d if the ON/OFF data for the arrow display indicates ON.

Subsequently, display data and arrow display ON/OFF data are read from Av table on the basis of a value corresponding to the Av pointer minus 0.5; this data is displayed in the second proposed value display sub-area 28c and the second arrow display sub-area 28e, respectively. The mark "▼" will be displayed in the second arrow display sub-area 28e if the arrow display data is determined to be ON (step S25). Based on the set Av pointer, Av data is displayed in the first current value display sub-area 28a (step S21).

In AUTO or MANUAL mode with priority given to Tv, the Tv pointer is set to the data corresponding to a manually set Tv value (step S26). Appropriate display data is then read from the Tv table on the basis of the Tv pointer and displayed in the first current value display sub-area 28a (step S27).

Next, based on a value equal to the Tv pointer plus 0.5, appropriate display data is read, together with ON/OFF data for the arrow display, from the Tv table; this data is displayed in the first proposed value display sub-area 28b and the first arrow display sub-area 28d, respectively (step S28). The mark "▲" is displayed in the first arrow display sub-area 28d if the ON/OFF data for the arrow display indicates ON.

Based on a value equal to the Tv pointer minus 0.5, appropriate display data is read, together with ON/OFF data for the arrow display from the Tv table; this data is displayed in the second proposed value display sub-area 28c and the second arrow display sub-area 28e, respectively (step S29). The mark "▼" is displayed in the second arrow display sub-area 28e if the ON/OFF data for the arrow display indicates ON.

Figure 7:
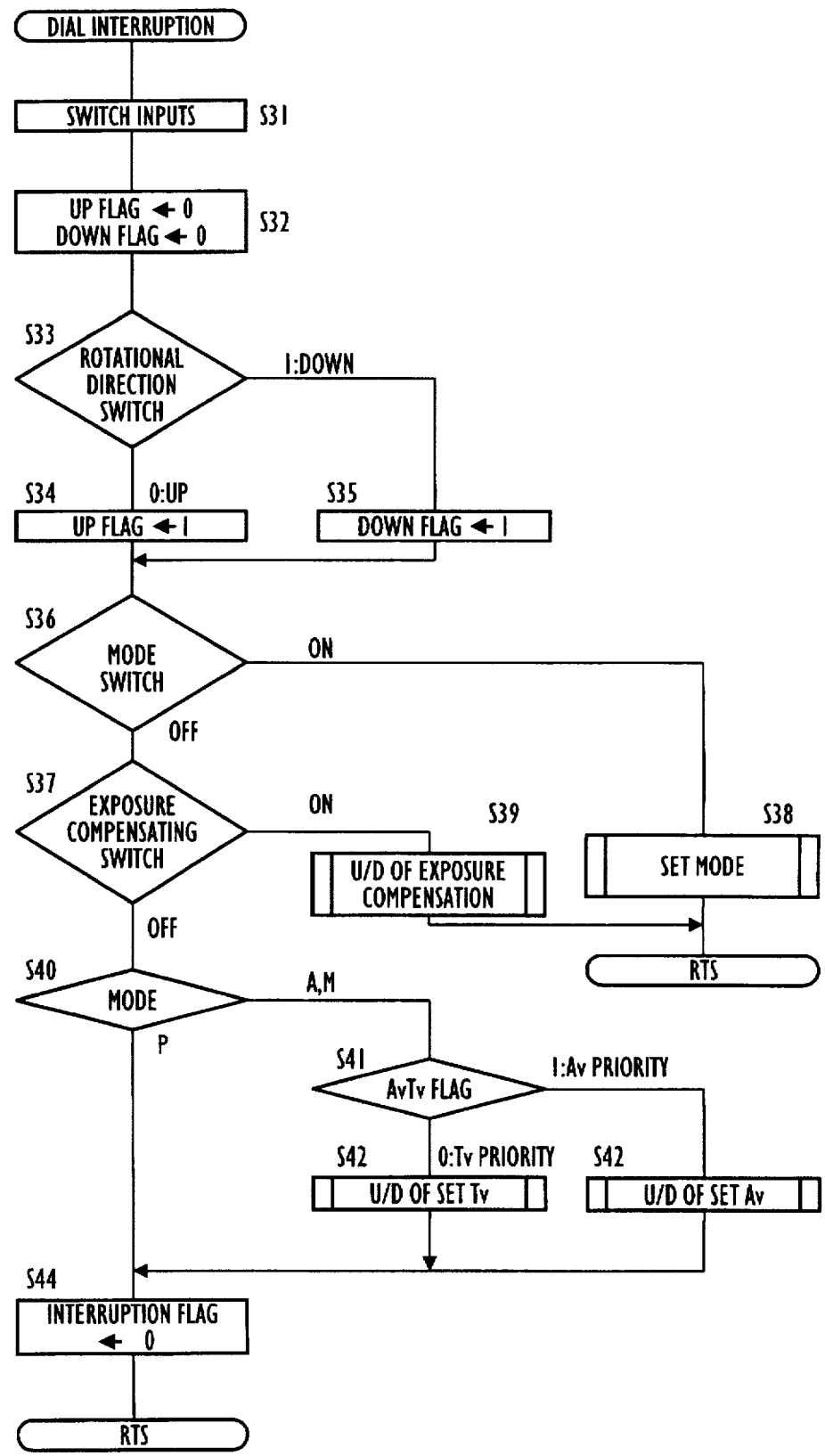
FIG. 7 is a flow chart showing a routine of dial interruption.

Next, a dial interruption handling routine run during operation of the rotary dial 32 will be discussed in reference with a flow chart of FIG. 7. More specifically, such handling is run during a rise time of the signal provided from the rotational direction switch.

Upon occurrence of an interruption, the states of the respective switches are input to the control circuit, and UP and DOWN flags are cleared (steps S31 and S32). The direction in which the rotary dial 32 has been rotated is detected from a state of the rotational direction switch. The UP flag is set to 1 if the rotary dial 32 has been rotated in the UP-direction (i.e., clockwise) and the DOWN flag is set to 1 if the rotary dial 32 has been rotated in the DOWN-direction (counterclockwise) (steps S33 through S35).

Steps S36 and S37 detect states of the mode switch 90 and the exposure compensating switch 92, respectively.

If the mode switch 90 is ON, step S38 executes operation of mode setting. If the mode switch 90 is OFF while the exposure compensating switch 92 is ON, step S39 executes UP-DOWN processing of exposure compensation. For the operation of mode setting, the rotary dial 32 is rotated with the mode switch 90 is held in its ON state; the photographing mode is thereby switched between three modes, i.e., PROGRAM mode, AUTO mode and MANUAL mode.

It is now assumed that the mode switch 90 and the exposure compensating switch 92 are OFF, and the photographing mode is AUTO or MANUAL. If the exposure mode with priority given to the shutter is selected, UP-DOWN processing of the set Tv as described below is executed. If the exposure mode with priority given to the diaphragm is selected, UP-DOWN processing of the set diaphragm stop value is executed and the interruption flag is cleared, whereupon the routine returns to the step prior to the interruption (steps S40 through S44).

In the PROGRAM mode, both AV and Tv are automatically set by the camera and no manual setting is required. Therefore, no UP-DOWN processing of Tv and Av is executed, and the routine returns to the step prior to the interruption immediately after the interruption flag is cleared.

Figure 8:
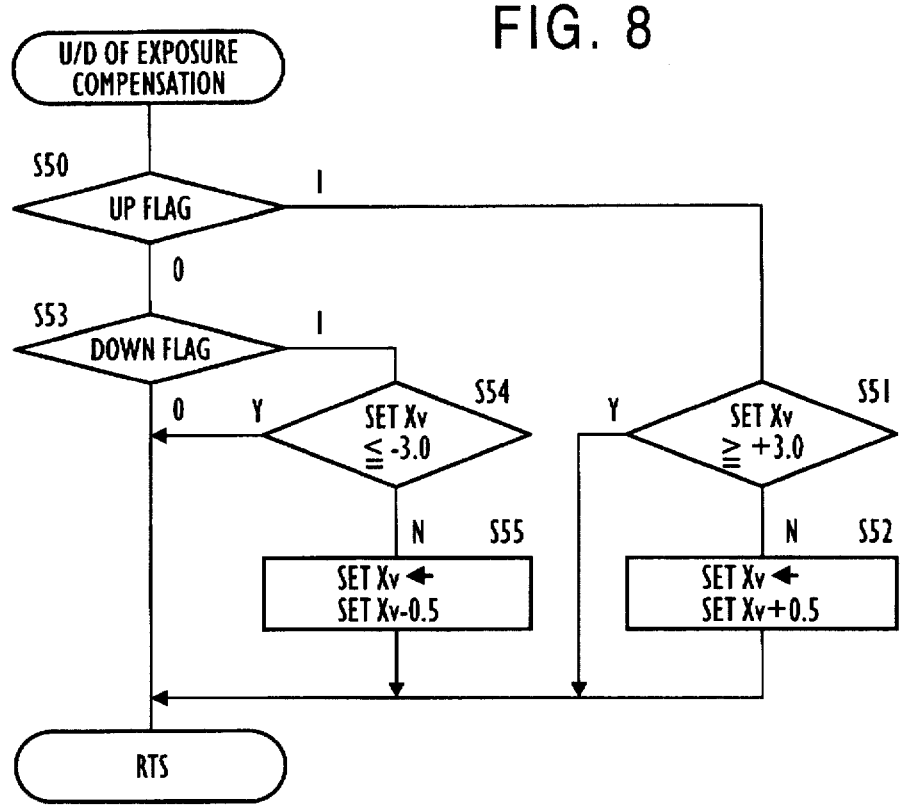
FIG. 8 is a flow chart showing a routine of exposure compensating U/D processing during the dial interruption.
Figure 9:
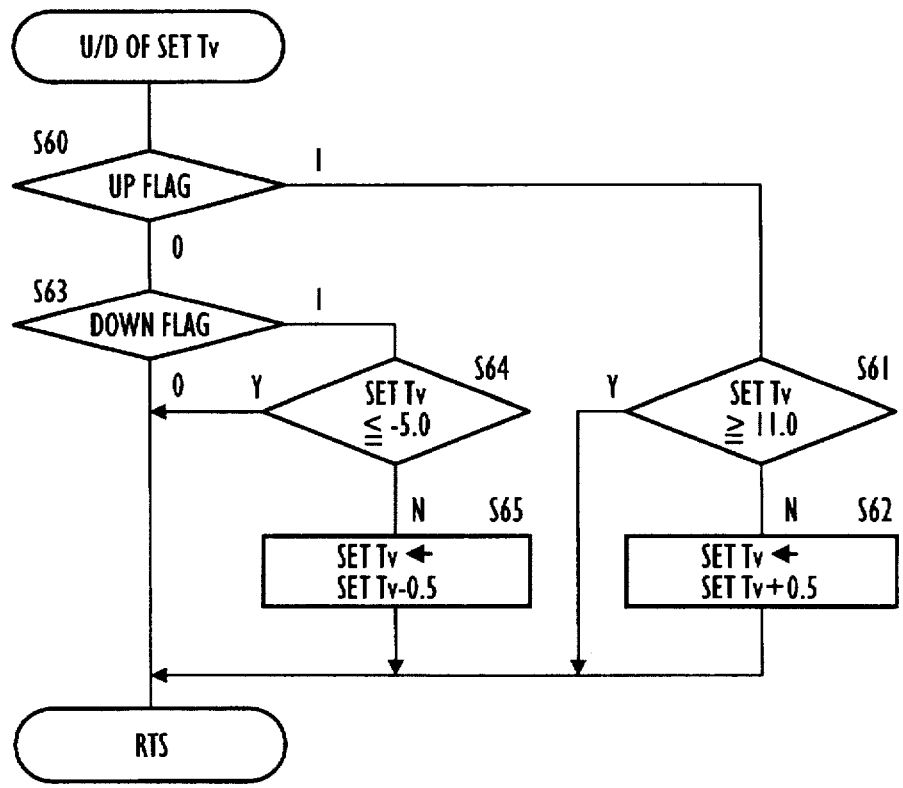
FIG. 9 is a flow chart showing a routine of set Tv U/D processing during the dial interruption.
Figure 10:
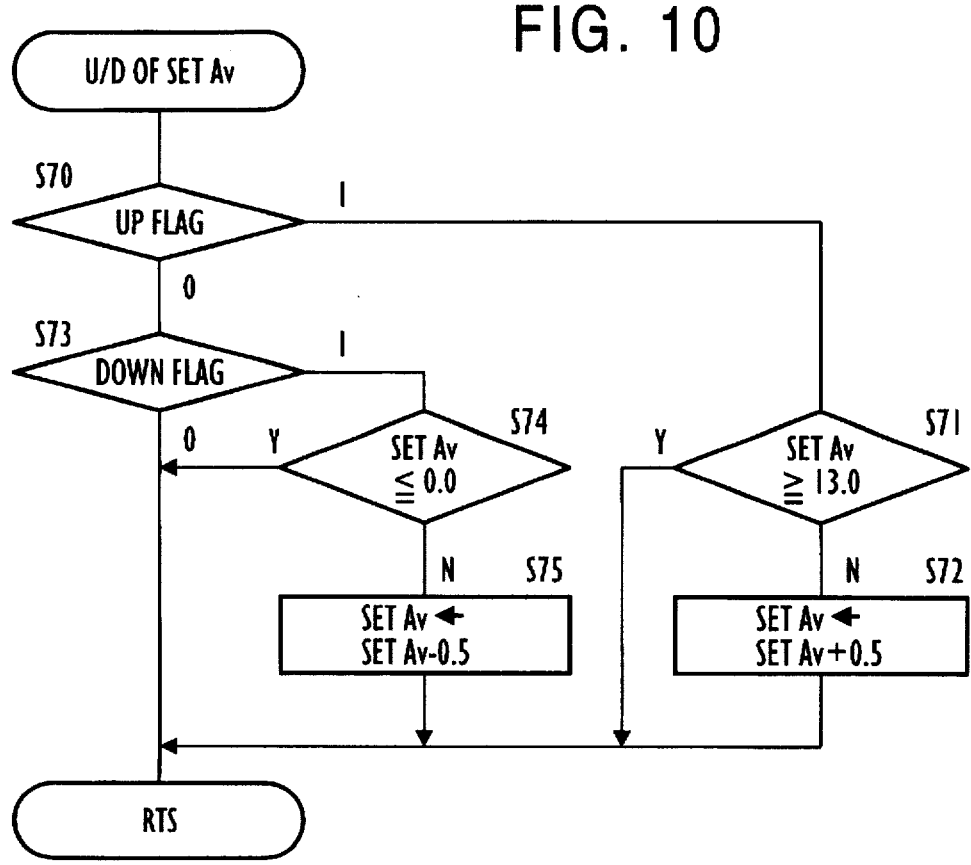
FIG. 10 is a flow chart showing a routine of set Av U/D processing during the dial interruption.

FIGS. 8 through 10 illustrate respective UP-DOWN processing executed during the previously described step of dial interruption.

In the UP-down processing of exposure compensation illustrated by a flow chart of FIG. 8, 0.5 is added to the set value of Xv (steps S50 through S52) if the UP flag is set to 1 and the current set value of Xv is not higher than the upper limit value of 3.0. Furthermore, 0.5 is substracted from the set value of Xv (steps S50, S53, S54, S55) and the set value of Xv is reset if the DOWN flag is set to 1 and the current set value of Xv is not less than the lower limit value of −3.0.

When the current set value of Xv has reached the upper or lower limit value, the routine returns to the step of dial interruption even if the UP flag and the DOWN flag are 1, respectively.

In the UP/DOWN processing shown by FIG. 9, the set value of Tv is UP/DOWN processed with increments of 0.5 between an upper limit value of +11.0 and a lower limit value of −5.0 in a manner similar to FIG. 8 (steps S70 through S75).

In the UP/DOWN processing shown by FIG. 10, the set value of Av is UP/DOWN processed with increments of 0.5 between an upper limit value of 13.0 and a lower limit value of 0.0 in a manner similar to the case shown by FIG. 8 (steps S80 through S85).

Figure 11:
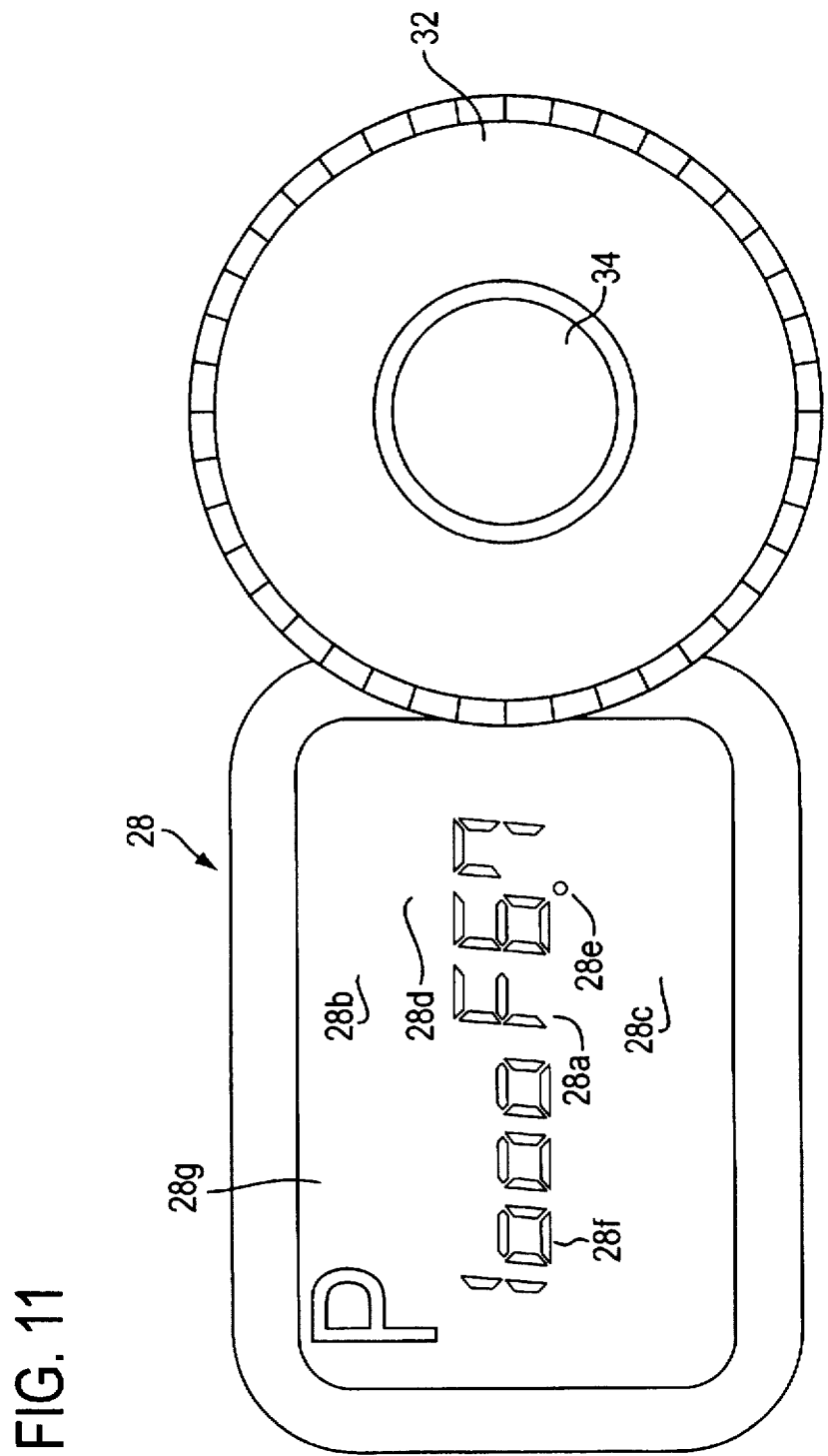
FIG. 11 is a diagram showing an example of display in the PROGRAM mode.

Several specific examples of the display on the liquid crystal display panel 28 under the previously discussed control will now be described. FIG. 11 shows such a display occurring when the camera is in PROGRAM mode and the exposure compensating switch 92 is OFF. In this case, the display includes "P" representing the PROGRAM mode in the mode display sub-area 28g, "1000", representing a shutter speed (i.e., 1/1000 sec.) in the second current value display sub-area 28f, and a diaphragm stop value "F 6.7" in the current value display sub-area 28a.

In the PROGRAM mode, the shutter speed and the diaphragm stop value have already been determined by the predetermined program chart on the basis of the exposure value Ev and a combination of Tv and Av, and cannot be changed by operation of the rotary dial 32. Accordingly, display of proposed values would be meaningless and display sub-areas 28b, and 28c, 28d and 28e will be blank.

Figure 12:
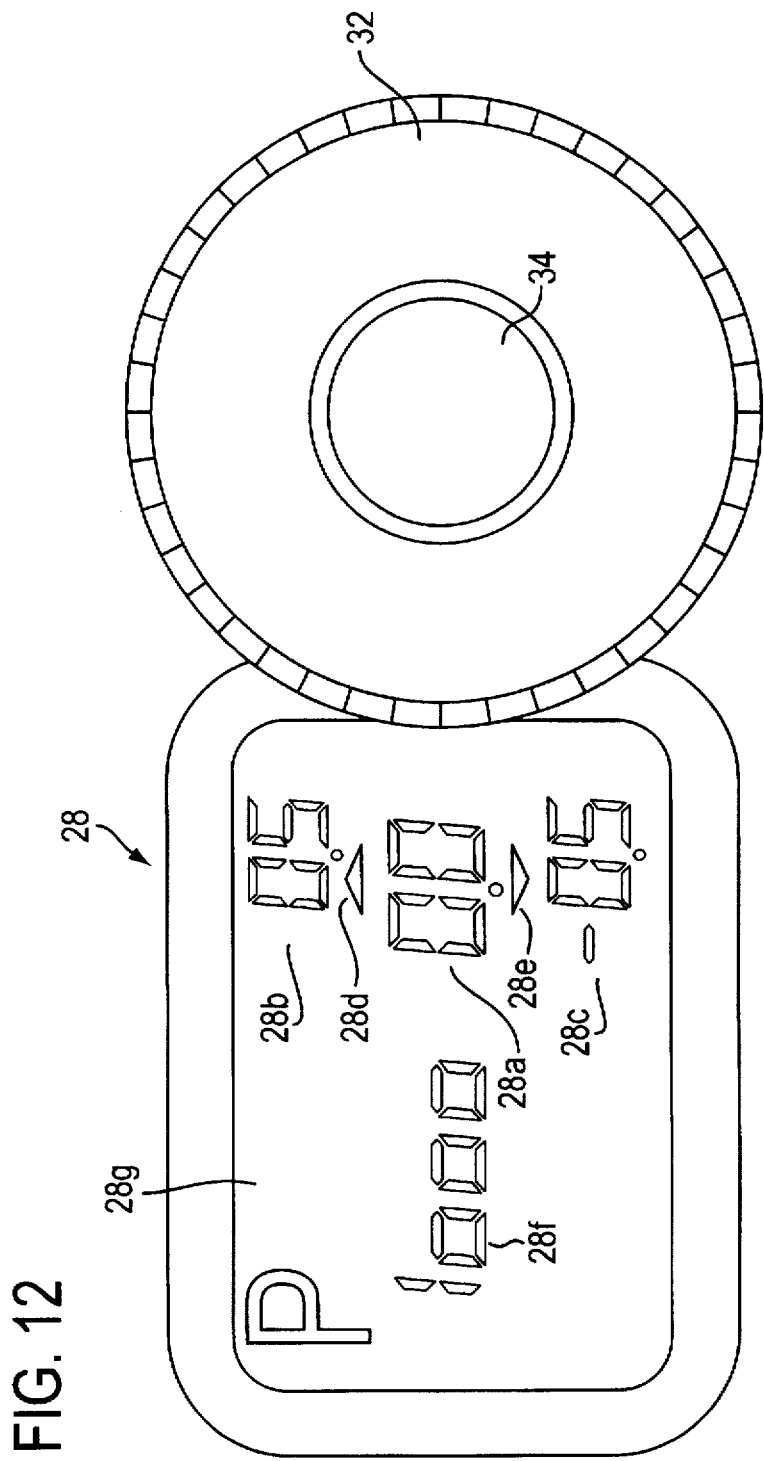
FIG. 12 is a diagram showing an example of display during the exposure compensation in the PROGRAM mode.

FIG. 12 shows a display appearing when the exposure compensating switch 92 is turned ON from the state of FIG. 11. The display data in the mode display sub-area 28g and the second current value display sub-area 28f do not change while the display in the dial display sub-areas 28a through 28e do change. As shown, the current value of the Xv pointer is 0.0 and the display data "0.0" corresponding to the pointer 0.0 read from the table shown in TABLE 1 and displayed in the first current value display sub-area 28a.

The display data "0.5" corresponding to the current Xv pointer 0.0 plus 0.5 and the mark "▲" are displayed in the first proposed value display sub-area 28b and the first arrow display sub-area 28d, respectively. On the other hand, the display data "−0.5" corresponding to the current pointer 0.0 minus 0.5 and the mark "▼" are displayed in the second proposed value display sub-area 28c and the second arrow display sub-area 28e, respectively.

When the rotary dial 32 is rotated clockwise by one step from the state of FIG. 12, the current Xv pointer is set to 0.5, the digital values "0.5", "1.0" and "0.0" are displayed in the first current value display sub-area 28a, and the first and second proposed value display sub-areas 28b and 28c, respectively.

Figure 13:
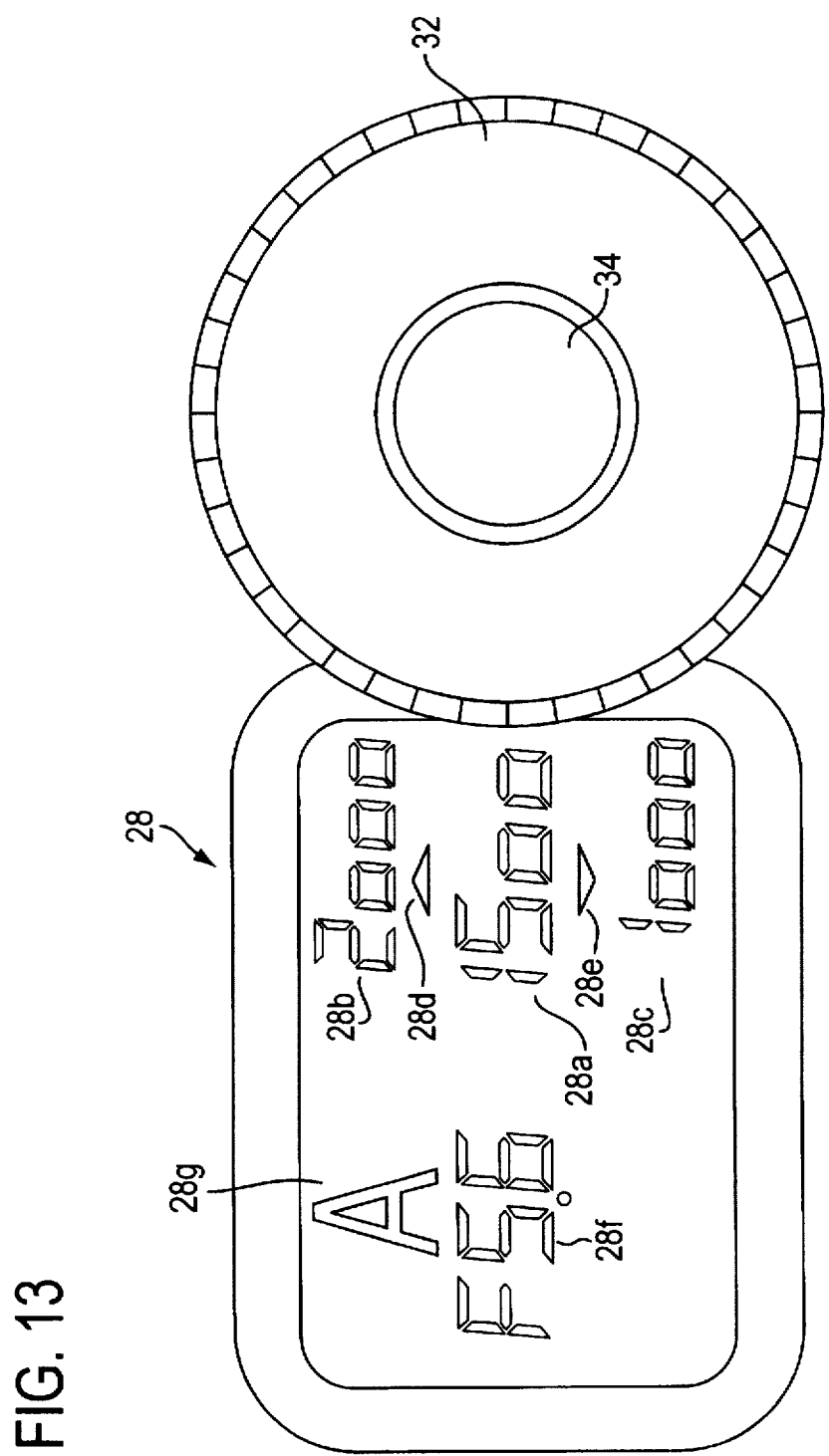
FIG. 13 is a diagram showing an example of display in the AUTO mode with priority given to the shutter.

FIG. 13 shows the display appearing in the case of AUTO mode with priority given to the shutter.

The AUTO mode "A" is displayed in the mode display sub-area 28g. With the current Tv pointer set to 10.5, "1500" representing a shutter speed (i.e., 1/1500 sec.) is displayed in the current value display sub-area 28a, "2000" associated with the Tv pointer 11.0 is displayed in the first proposed value display sub-area 28b, and "1000" associated with the Tv pointer 10.0 is displayed in the second proposed value display sub-area 28c. In the respective arrow display sub-areas 28d and 28e, "▲" and "▼" are displayed in association with the pointers 11.0 and 10.0, respectively.

In the second current value display sub-area 28f, the diaphragm stop value "F 5.6" 5.6," calculated on the basis of the set value of shutter speed, is displayed.

Figure 14:
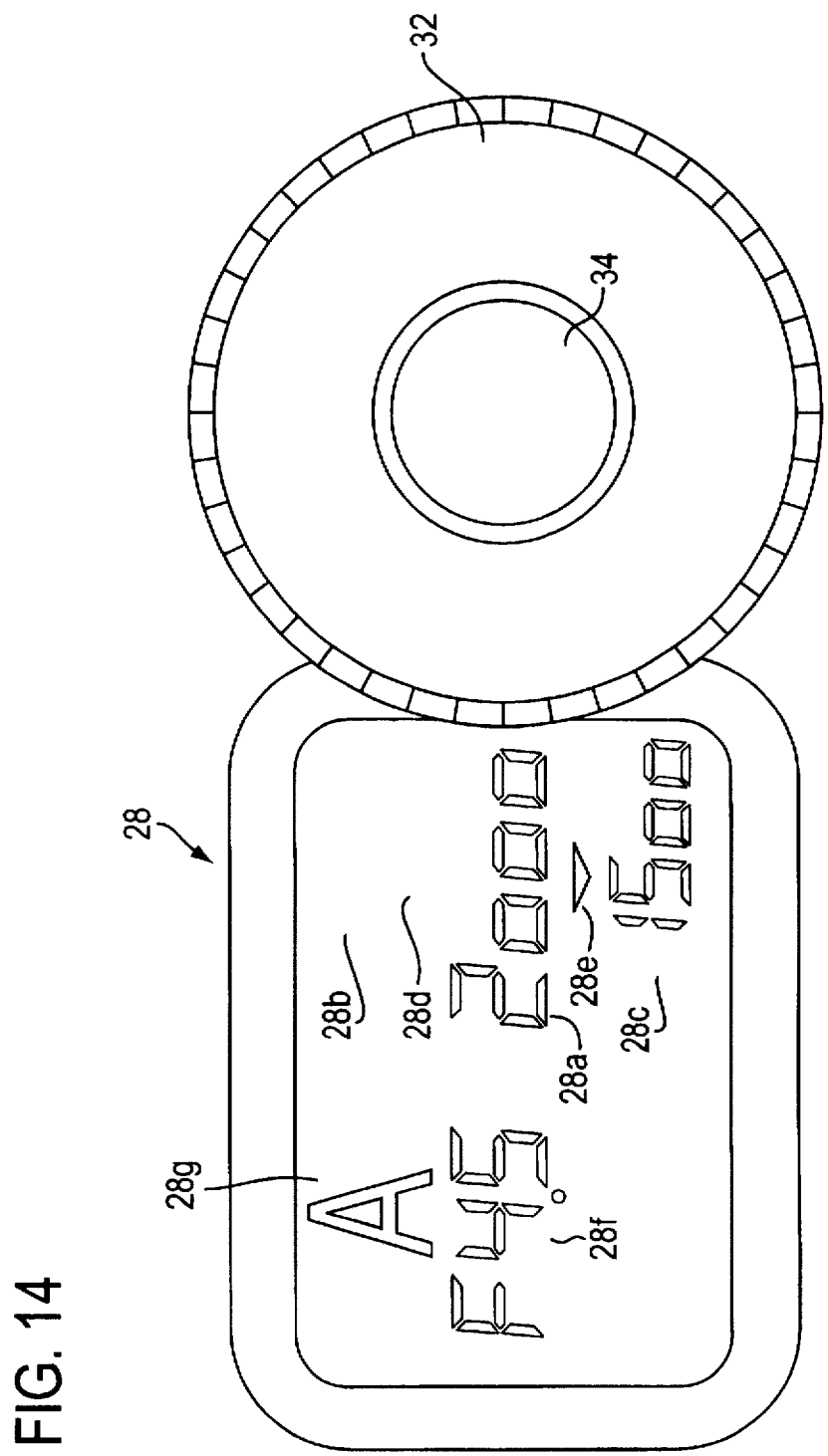
FIG. 14 is a diagram showing another example of display in the AUTO mode with priority given to the shutter.

When the rotary dial 32 is rotated clockwise by one step from the state of FIG. 13, the current Tv pointer is set to 11.0. As shown by FIG. 14, "2000" is displayed in the first current value display sub-area 28a, and "1500" is displayed in the second proposed value display sub-area 28c. The display data associated with the Tv pointer 11.5 is blank, so the first proposed value display sub-area 28b as well as the first arrow display sub-area 28d are also blank. Therefore, neither the digital value or the arrow is displayed.

Figure 15:
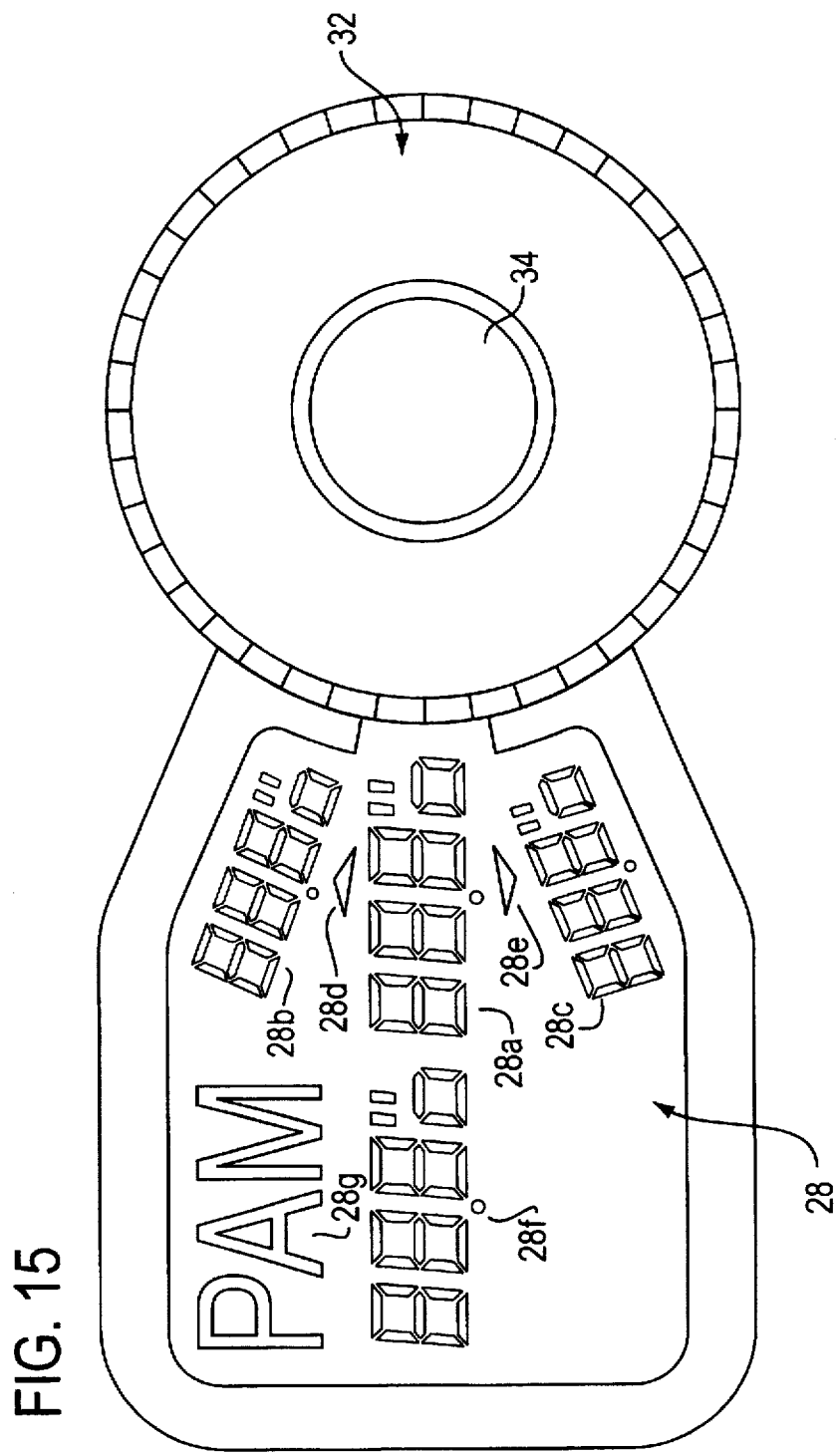
FIG. 15 is a diagram showing of the liquid crystal display panel according to another embodiment of the the present invention and, FIG. 16 is a diagram showing liquid crystal display panel according to still another embodiment of the present present invention.
Figure 16:
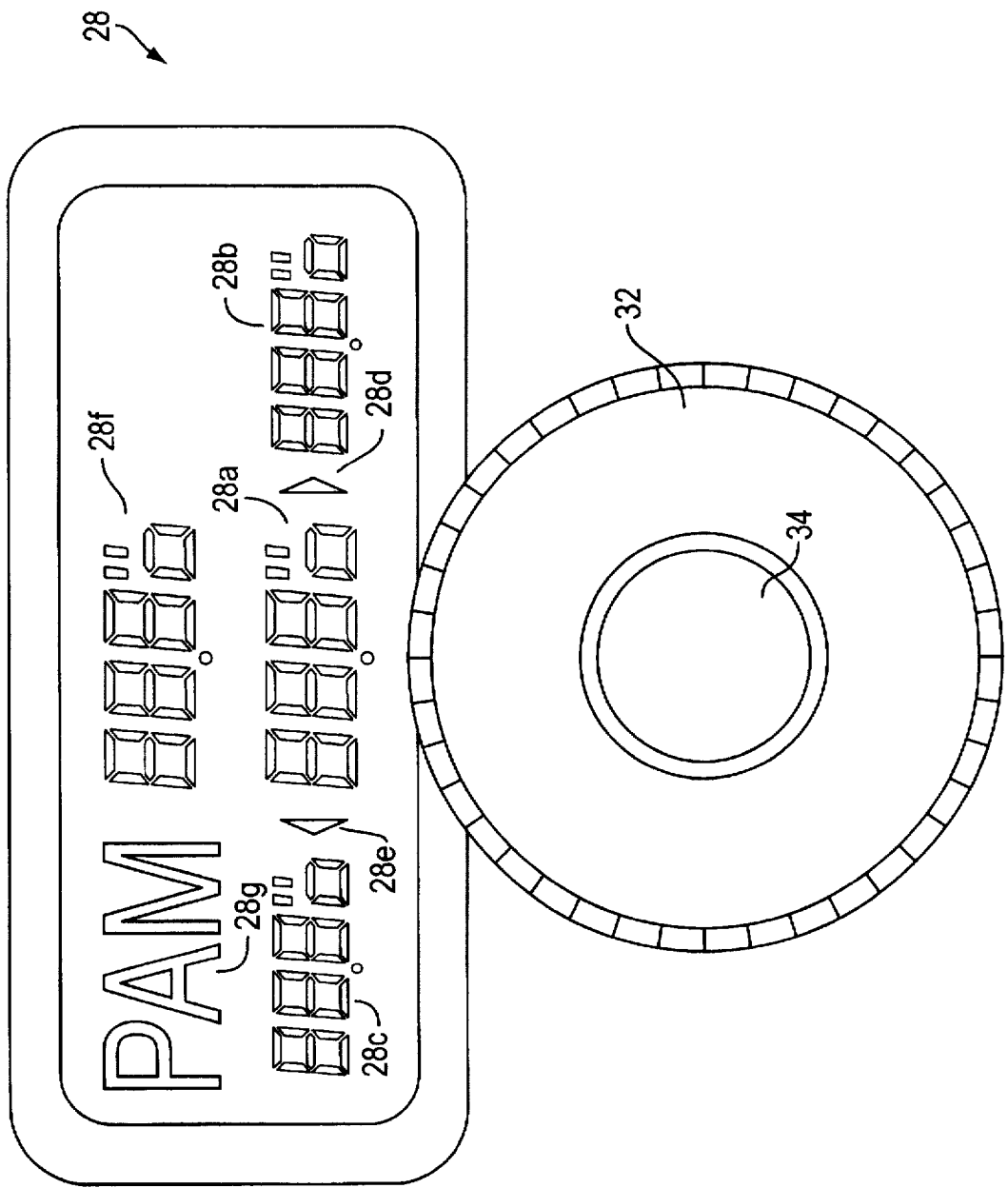

FIGS. 15 and 16 show another embodiment of the liquid crystal display panel 28. According to FIG. 15, the first and second proposed value display sub-areas 28b and 28c of the dial display area are arranged obliquely with respect to the first current value display sub-area 28a so as to extend radially outward from the respective points on the circumference of the rotary dial 32. The embodiment of FIG. 15 is advantageous in that the operative association of displaying in the dial display sub-areas 28a, 28b, and 28c with operation of the rotary dial 32 can be more clearly recognized than in the previously described embodiment.

According to the embodiment of FIG. 16, the liquid crystal display panel 28 and the rotary dial 32 are arranged axially of the camera with the liquid crystal display panel 28 being more remote than the rotary dial 32 from the operator. In this embodiment, the dial display sub-areas 28a, 28b, and 28c are arranged in alignment with one another transversely of the camera.

The first and second embodiments of the liquid crystal display panel 28 have an inconvenience such that, for example, if the operator rotates the dial with the left hand, the display will sometimes be concealed behind the hand, since the liquid crystal display panel 28 is provided on the left side of the rotary dial. In the embodiment of FIG. 16, however the liquid crystal display panel 28 will not be concealed behind the hand which rotates the rotary dial regardless of whether it is the left hand or the right hand.

Furthermore, for the display panels shown by FIGS. 15 and 16, control of the displaying is performed in the same manner as in the first embodiment and no repetitive description thereof will be made.

While the information setting and displaying device of the invention has been described hereinabove as applied to the single-lens reflex camera, it should be understood that the device according to the present invention is not limited thereto but is also applicable to other cameras, e.g. compact camera or a video camera.

While the dial display area is provided with three digital value display sub-areas in the embodiments as have been described and illustrated, an alternative arrangement is also possible in which at least a pair of digital value display sub-areas are provided so that the current value and only one proposed value set by operation of the rotary dial may be displayed. Furthermore, another arrangement is also possible in which four or more display sub-areas are parallelly provided so that, in addition to the current value, a value set by rotation of the dial by one step, a value set by rotation of the dial by two steps, etc. may be displayed.

The information to be displayed in the dial display area may utilize, in addition to the tables containing the digital information as have been described in connection with the illustrated embodiments, other tables containing information other than digital values, for example, letters and symbols.

As will be readily appreciated from the foregoing description, the invention allows an operator to foreknow how the set values will be changed depending on the direction in which the rotary dial is rotated, since, in addition to a currently set information, other information changed by operation of the rotary dial is displayed in association with the direction in which the rotary dial is rotated, (i.e., shutter speed and diaphragm stop value).

We claim:

1. An information setting and displaying device for a camera, comprising:

a rotary dial stepwise rotatably mounted on a camera body;

a display member, provided adjacent said rotary dial, and including at least first and second display sub-areas fixedly positioned and arranged along a direction in which said rotary dial rotates;

information setting means for setting information to be displayed by operating said rotary dial, said information comprising a plurality of discrete values in a sequence; and, display control means for electronically displaying a currently set one of said plurality of discrete values in said first display sub-area and for displaying another of said plurality of discrete values, sequentially adjacent said one of said plurality of discrete values, in said second display sub-area;

wherein said another of said plurality of discrete values is displayed in said first display sub-area in response to rotation of said rotary dial in the direction from said second display sub-area toward said first display sub-area by at least one step.

2. An information setting and displaying device for a camera according to claim 1, wherein said display sub-areas are arranged in parallel with the direction in which said rotary dial rotates.

3. An information setting and displaying device for a camera according to claim 1, wherein said plurality of discrete values is digital value data.

4. An information setting and displaying device for a camera according to claim 1, wherein said information is related to at least one of a shutter speed, a diaphragm stop and an exposure compensation value.

5. An information setting and displaying device for a camera according to claim 1, further comprising memory means for storing digital information changeable by operating said rotary dial, said digital information stored in the form of digital value tables, each of said tables containing a plurality of digital values arranged in a predetermined order, said information setting means setting information read from said memory means, and said display control means displaying said next information of said predetermined order read from said memory.

6. An information setting and displaying device for a camera according to claim 5, wherein said display member includes first, second and third digital value display sub-areas arranged in parallel with said direction in which the rotary dial is rotated; and said display control means displays a current set digital information value in said second digital value display sub-area, and reads from said memory means digital information values to be set by operating said rotary dial toward the first and third digital value display sub-areas located around said second digital value display area.

7. An information setting and displaying device for a camera according to claim 6, wherein said display member further includes first and second arrow display sub-areas located between said first and second and said second and third digital display sub-areas, and said display control means displays, in said arrow display sub-areas, arrows pointing to the respective digital value display sub-areas from the second digital value display sub-area.

8. An information setting and displaying device for a camera according to claim 5, wherein said display control means displays a blank in said second digital value display sub-area when an end value in the digital value table contained in said memory means is displayed in said first digital value display sub-area of said display member, and there is no value to be set as said rotary dial rotates toward said second digital value display sub-area.

9. An information setting and displaying device for a camera according to claim 7, wherein said display control means displays a blank in one of said first and second arrow display sub-areas when an end value in the digital value table contained in said memory means is displayed in said second digital value display sub-area of said display member, and there is no value to be set as said rotary dial rotates toward one of said first and third digital value display sub-area.

10. An information setting and displaying device for a camera according to claim 5, wherein said memory means stores as the digital value information, at least one of a shutter speed, a diaphragm stop, and an exposure compensation value.

11. An information setting and displaying device for a camera according to claim 5, wherein said memory means stores, as digital information, at least two groups of digital information values said groups containing information values related to a shutter speed, a diaphragm stop, and an exposure compensation value, and wherein said setting means and said display control means set and display said digital information.

12. An informaton setting and displaying device for a camera according to claim 11, further comprising a selector switch for selecting one of said groups of digital information values, provided on said camera body seprate from said rotary dial.

13. An information setting and displaying device for a camera according to claim 12, wherein said display control means displays a blank in said second digital value display sub-area when said camera is in a Program mode and one of said shutter speed and said diaphragm stop is selected to be displayed by said display member.

14. An information setting and displaying device for a camera according to claim 1, wherein said rotary dial provides an absolute coordinate of an angular position of said rotary dial to said setting means and said display control means as information.

15. An information setting and displaying device for a camera according to claim 1, wherein said rotary dial provides information, including a relative change in angular position, to said setting means and said display control means.

16. An information setting and displaying device for a camera according to claim 1, wherein said display member includes, in addition to said information display sub-areas arranged in parallel with the direction in which said rotary dial is rotated, at least one other information display sub-area.

17. An information setting and displaying device for a camera, comprising:

a rotary dial stepwise rotatably mounted in an adjustable manner on a camera body with a unit step corresponding to a predetermined angle of rotation;

a display member provided adjacent said rotary dial, and including at least a first and second digital value display sub-areas arranged in parallel with a direction in which said rotary dial rotates, and fixedly positioned relative to said rotary dial;

storage means for storing digital information changeable by operating said rotary dial, in the form of a digital value tables, said digital information changeable by operation of said rotary dial each of said tables containing a plurality of digital values arranged in a predetermined order;

means for setting said digital information by operating said rotary dial; and display control means for displaying a current set digital information value in said first digital value display sub-area, and for reading from said storage means a digital value to be set as said rotary dial rotates in the direction from said first display sub-area toward said second display sub-area by at least one and for displaying said digital value to be set in said second digital value display sub-area.

18. An information setting and displaying device for a camera, comprising:

a rotary dial rotatably mounted in an adjustable manner, a display member provided adjacent said rotary dial, and including a current value display sub-area and at least one proposed value display sub-area fixedly positioned relative to said rotary dial member;

storage means for storing digital information changeable by operating said rotary dial, said digital information stored in the form of tables, each of said tables containing digital values arranged in a predetermined order;

means for setting said digital information by operating said rotary dial; and, display control means for displaying a current set digital information value in said current value display sub-area, reading from said storage means a digital information value to be set as said rotary dial rotates toward said proposed value display sub-area, and displaying said digital information value to be set in said proposed value display sub-area.

19. An information setting and displaying device for a camera according to claim 18, wherein said at least one proposed value display sub-area is on either side of said current value display sub-area.

20. An information setting and displaying device for a camera, comprising:

a rotary dial stepwise rotatably mounted in an adjustable manner on a camera body with a unit step corresponding to a predetermined angle of rotation;

a member provided adjacent said rotary dials and including at least first and second digital value display sub-areas arranged in parallel along the direction in which said rotary dial rotates;

storage means for storing digital information changeable by operating said rotary dial, in the form of digital value tables, each of said tables containing a plurality of digital values arranged in a predetermined order;

means for setting said digital information by operating said rotary dial; and, display control means for displaying first and second adjacent digital information values, from one of said tables of digital values, in said digital value display sub-areas, and for chancing said digital information values displayed in said digital information value display sub-areas successively in accordance with a predetermined order in said tables in operative association with an operation of said rotary dial.

21. An information setting and displaying device for a camera according to claim 20, wherein said member includes first, second and third digital value display sub-areas arranged in parallel along a direction in which said rotary dial rotates, and said display control means displays first, second and third values successively arranged in said tables in said first, second and third digital display sub-areas, respectively.

22. An information setting and displaying device for a camera comprising:

a rotary dial stepwise rotatably mounted in an adjustable manner on a camera body with a unit step corresponding to a predetermined angle of rotation;

a display member provided adjacent said rotary dial, and including at least first and second digital value display sub-areas arranged in parallel with the direction in which said rotary dial rotates and fixedly positioned relative to said rotary dial;

storage means for storing digital information changeable by operating said rotary dial, in the form of digital value tables, each of said tables containing a plurality of digital values arranged in a predetermined order;

means for setting said digital information by operating said rotary dial; and, display control means for displaying a current set information value in said first display sub-area, for reading from said storage means an information value to be set as said rotary dial rotates toward said second display sub-area, and for displaying said information value to be set in said second display sub-area.

23. An information setting and displaying device for a camera according to claim 22, wherein said display member includes first, second and third display sub-areas arranged in parallel along the direction in which said rotary dial rotates, and said display control means displays a current set information value in the second display sub-area, reads from said storage means said information values to be set as said rotary dial is rotated by one step toward said first and third display sub-areas, and displays said information values in said first and third display sub-areas, respectively.

24. An information setting and displaying device for a camera, comprising:

a rotary dial rotatably mounted on said camera in an adjustable manner;

a display member provided adjacent said rotary dial, and including first, second and third digital value display sub-areas positioned and arranged in parallel along a direction in which said rotary dial rotates, and first and second arrow display sub-areas arranged between each pair of adjacent ones of said first, second and third digital value display sub-areas to indicate the direction in which the digital value display will change;

storage means for storing digital information changeable by operating said rotary dial, in the form of digital value tables, each of said tables containing a plurality of digital values arranged in a predetermined order;

means for setting said digital information by operating said rotary dial; and, display control means for displaying a current set digital information value in the second sub-area of said digital value display sub-areas, and digital information values immediately preceding and following the current set value in said digital value tables in said first and third digital value display sub-areas, respectively, and to display arrows respectively pointing in opposite directions in said arrow display sub-areas so as to indicate a relationship between a direction in which said rotary dial rotates and the sub-area displaying the digital information value to be set as said rotary dial rotates.

25. An information setting and display device, comprising:

a switch that sets a operational parameter;

a memory;

a plurality of discrete values that control said operational parameter in a sequence stored in said memory;

a display including at least first and second display sub-areas fixedly positioned with respect to said switch and;

a display control that electronically displays a currently set one of said plurality of discrete values in said first display sub-area and for displaying another of said plurality of discrete values, which is adjacent said one of said plurality of discrete values in said sequence, in said second display sub-area;

wherein said another of said plurality of discrete values is displayed in said first display sub-area in response to movement of said switch in a direction from said second display sub-area toward said first display sub-area.

26. The information setting and display device of claim 25, wherein said display control means displays a blank in at least one of said first and second display sub-areas when said one of said plurality of discrete values is at an end of said sequence.

27. The information setting and display device of claim 25, wherein said switch is a rotary dial, and another of said plurality of discrete values is displayed in said first display sub-area in response to clockwise rotation of dial.

28. The information setting and display device of claim 25, wherein said switch is a rotary dial, and another of said plurality of discrete values is displayed in said first display sub-area in response to counterclockwise rotation of dial.

29. An information setting and display device, for a camera, comprising:

a switch;

a memory, a plurality of discrete values in a sequence stored in said memory;

a display including a first, second, and third display sub-areas fixedly positioned with respect to said switch; and display control means for electronically displaying first second and third adjacent values of said plurality of discrete values in said first, second and third display sub-areas, respectively, said second adjacent value representing a current setting of said camera;

wherein said first adjacent value is displayed in said second display sub-area in response to movement of said switch in a direction from said first display sub-area toward said second display sub-area, and wherein said third adjacent value is displayed in said second display sub-area in response to movement of said switch in a direction from said third display sub-area toward said second display sub-area.

30. The information setting and display device of claim 29, in said switch compromising a rotary dial, said first adjacent value being displayed in said second display sub-area in response to clockwise rotation of said dial, and said third adjacent value being displayed in said second display sub-area in response to counterclockwise rotation of said dial.

31. The information setting and display device of claim 29, wherein said display control means displays a blank in said first display sub-area when said second adjacent value is at a first end of said sequence, and displays a blank in said third display sub-area when said second adjacent value is at a second end of said sequence.

* * * * *